Patented Feb. 17, 1942

2,273,778

UNITED STATES PATENT OFFICE 2,273,778

METHOD OF INCREASING THE DURABILITY OF GLASSWARE

Walter K. Berthold, Rockville, Conn., assignor to Hartford-Empire Company, Hartford, Conn., a corporation of Delaware No Drawing. Original application March 17, 1939, Serial No. 262,415. Divided and this application March 27, 1939, Serial No. 264,479

3 Claims. (Cl. 49—79)

This invention relates to methods of treating articles of glassware, by which the durability of the glass is improved.

In the manufacture of glass containers, as for example bottles intended as containers for gin, spirits and other substances which tend to attack the walls of the container, it has been considered essential to select the glass batch with a view to obtaining a glass having a certain desirable combination of physical and chemical characteristics.

To improve the speed and/or reduce the cost of manufacturing operations, it is generally desirable to employ a glass which melts at a relatively low temperature, and especially in the automatic manufacture of glassware at high speeds, good working and rapid setting qualities in the glass are also desirable.

It is well known in the art that inclusion of certain ingredients in the batch will tend to reduce the melting point, and that other ingredients tend to improve the workability of the glass. However it is equally well known that the batches which melt at relatively low temperatures and/or are readily workable by modern methods frequently do not result in glasses having sufficient durability. Hence it has been necessary to compromise in the selection of these ingredients and frequently to sacrifice ease of melting and cheapness of manufacture to obtain a sufficient durability.

I have discovered a novel method of treating glass, preferably during the stages of its manufacture, by which a glass having desirable qualities with respect to its melting and workability, but which otherwise would be insufficiently durable for its intended purpose, may be improved as to durability to an extent which will render it satisfactory. The principal object of this invention is, therefore, to provide such a novel method of treating glassware to improve this durability.

In general, this method comprises introducing into the glass article steam under pressure and to thereafter remove substantially all of the steam from the article before the glass is placed in the lehr, preferably before its temperature is reduced below its low annealing temperature (usually about 800° F. in common glasses). The steam may be employed to blow the glass to final form and/or to cool the interior of the glass article to the desired extent. The steam is preferably removed by introducing a scavenging current of air into the article.

The method may be carried out automatically or manually by any suitable means but I prefer that the same be performed by the use of mechanism for blowing and cooling the article disclosed in my copending application Serial No. 262,415, filed March 17, 1939.

My novel method appears to be of substantial advantage in improving the durability of glasses of substantially all types commonly employed in the glass industry. It has been particularly tested in connection with ordinary silica-soda-lime bottle glasses such as are commonly employed in the automatic production of gin bottles. Heretofore considerable difficulty has been experienced by glass manufacturers in providing suitable glass containers for gin, because the gin vigorously attacks the walls of the containers and causes a white precipitate if kept in storage for substantial periods of time. This frequently renders the goods unsalable. Various methods of preparing containers for gin from ordinary glasses have been proposed. One of these methods which has been employed in commercial production involves the treatment of the bottles by the deposit therein of pellets of sulphur prior to their introduction into the anealing lehr. This method is disclosed in U. S. patent to Urban E. Bowes No. 2,046,302. This treatment of the bottles adds considerably to their cost, as it adds not only the cost of the sulphur and the operation of depositing same in the bottles, but also requires that the bottles be washed to remove the "bloom" or deposit on the surface of the bottles resulting from this treatment.

In my novel method, in which steam is blown into and scavenged from the bottles, no additional operations are required, nor is there substantial added expense if the steam is employed for the purpose of expanding and/or cooling the bottles during their formation.

In the preferred manner of employing my novel method in the manufacture of glass bottles, a suitable automatic feeder may supply charges of glass (which glass is of such composition as to suitably reduce the melting and manufacturing costs) to a bottle machine which may be of any well-known kind, as for example, the Hartford-Empire Company's I. S. machine, in which the bottles are formed into parisons in the usual way and transferred to final blow molds in which they are then blown to final form. Preferably the final blowing is effected by the application of steam under pressure. The application of the steam may be continued for a suitable period after the expansion of the bottle is completed to aid in further chilling the interior of the bottle, after which it may be discontinued. Relatively dry air is then blown into and out of the bottle to remove the steam therefrom. Suitable apparatus for the application of the steam and the scavenging air is disclosed in my beforementioned copending application, but the use of my novel method is not dependent upon the use of the particular apparatus there disclosed.

The several steps in my method may be carried on either while the glass is in the blow mold or may occur, at least in part, after the mold is opened and while the bottle is at a relatively elevated temperature prior to its being placed in the annealing apparatus.

While I am unable at this time to fully and accurately explain the chemical and/or physical effect upon the walls of the bottles, which results in the increased durability, the fact that the durability is substantially increased has been established by careful durability tests made upon bottles treated in accordance with my method. As far as is now known, it appears that the effect upon the bottle wall surface is of substantially a different kind from that resulting from the prior methods of increasing durability, such as the sulphur treatment above described, in which earlier method it appears that the sulphur removes the alkali from the surface layer of the glass, probably forming a sulphate which appears as a "bloom" or deposit and which is washed off by the washing operation, leaving the surface of the glass relatively free from alkali. By my novel method, no "bloom" or deposit is created, nor does the bottle appear to undergo any injurious chemical change.

Having described my invention, what I claim is:

1. The method of increasing chemical durability of an article of glassware, which comprises the steps of introducing steam into said article and thereafter circulating a scavenging fluid through the article to remove steam and all residual moisture from the interior thereof.

2. The method of increasing the durability of an article of glassware which comprises the steps of introducing steam into said article and thereafter circulating a scavenging fluid through the article to remove steam and all residual moisture therefrom, all before the temperature of the article has been reduced substantially below 800° F.

3. The method of manufacturing hollow articles of glassware, having increased durability to chemical attack, which comprises introducing glass into the molds of a glass blowing machine, blowing the articles to final form by the application of steam under pressure, thereafter applying a current of relatively dry air to the interior of the articles to scavenge the steam and all residual moisture therefrom, and thereafter annealing the articles.

WALTER K. BERTHOLD.